United States Patent [19]

Ainis

[11] 4,181,346
[45] Jan. 1, 1980

[54] AERIAL-STABILIZER RUDDER FOR VEHICLES

[76] Inventor: Vincenzo Ainis, Via Bari 39/21, Genova, Italy

[21] Appl. No.: 813,967

[22] Filed: Jul. 8, 1977

[30] Foreign Application Priority Data

Jul. 12, 1976 [IT] Italy ................................ 1274 A/76

[51] Int. Cl.² ............................................ B62D 37/02
[52] U.S. Cl. ...................................... 296/15; 180/313
[58] Field of Search ............................ 46/202; 105/2; 180/1 FV; 188/270; 244/42 D, 42 DD, 50, 213, 217; 296/15, 91

[56] References Cited
U.S. PATENT DOCUMENTS

| 1,989,733 | 2/1935 | Bell | 180/1 FV |
|---|---|---|---|
| 2,976,077 | 3/1961 | Totton, Jr. | 296/15 |
| 3,455,594 | 7/1969 | Hall | 296/15 |
| 3,512,825 | 5/1970 | Green | 296/15 |
| 3,894,764 | 7/1975 | Powell | 296/15 |

*Primary Examiner*—Richard A. Bertsch
*Attorney, Agent, or Firm*—J. Harold Nissen

[57] ABSTRACT

An aerial-stabilizer rudder, to be mounted on the top of any vehicle, such as one operated by combustion, steam or electricity and operating on roads, tracks, or air cushions, to prevent the vehicle from skidding sideways and overturning, especially when the vehicle is operated at high speeds and around turns.

9 Claims, 3 Drawing Figures

AERIAL-STABILIZER RUDDER FOR VEHICLES

The present invention concerns an aerial-stabilizer rudder for vehicles.

It is well known that all moving vehicles, and particularly those operated at high speeds, are acted upon by centrifugal forces whenever they are required to change direction. The effect of centrifugal force is, as is well known, independent of the mode of propulsion utilized for the vehicle, or the manner in which the propulsive forces are utilized to move the vehicle. Thus, vehicles operated by combustion, steam, electrical, aerial propulsion, or turboiet engines and that run on wheels, on the roadway, on tracks, on air cushions, or are operated by other propulsion means or run on other surfaces or other means, are subject to centrifugal forces.

In general centrifugal force can be described as the tendency of the object to continue in a straight line when forces tending to change its direction act upon it. In a vehicle, centrifugal forces must be carried and counteracted by the wheels, suspension, transmission, or other analogous means, depending on the vehicle, and therefore act to reduce the useful life of these devices. In addition, skidding and overturning of a vehicle often places the life of its operator and passengers in jeopardy, as well as the life or health of persons nearby. Finally, the performance of the vehicle suffers as the operator of the vehicle must reduce the speed of the vehicle while taking a corner in order to maintain control of the vehicle, and thereafter must re-accelerate to regain his previous speed. This last problem is especially important to racecar operators during a race.

The aim of the invention is to reduce to a minimum, and as far as possible, even eliminate, all the above mentioned disadvantages, by teaching means that, when conveniently mounted on said vehicles, are able to maintain the same in equilibrium while taking a corner, utilizing air pressure to oppose or counteract the centrifugal force generated by the vehicle.

These means, according to the present invention, are composed of an aerial-stabilizer rudder which is to be secured to a vehicle and which utilizes air pressure generated by the apparent wind acting on it to restrain the tendency of the vehicle to side skid and possible overturn because of centrifugal forces generated when the vehicle executes a high speed turn.

This aerial-stabilizer rudder can be of any elongated shape, such as in form of an arrow, a rectangle, a rhomboid, a square, round, in the form of a banana. It is to be mounted on the top of a vehicle. It is important that the rudder is fixed to a vertical support, in the centre of the surface of the rudder himself. The vertical support must be placed in the exact centre of gravity of the vehicle. The aerial-stabilizer rudder will be therefore fixed in the direction of travel of the vehicle.

The two embodiments shown in the drawings are intended for the purposes of illustration only and are not intended to limit the scope of the invention. The objects, advantages and the routine of the invention will become readily apparent from the detailed description of the invention taken in connection with the accompanying drawings, in which FIG. 1 is a schematic view of a car, with the aerial-stabilizer rudder fixed on it;

FIG. 4 is a schematic view of an embodiment of the aerial-stabilizer rudder showing an additional weight mounted thereto; and FIG. 5 is a schematic view of a car, with the aerial-stabilizer rudder fixed on it, showing a transmission linking the steering mechanism of the car to the rudder.

Figure 1:
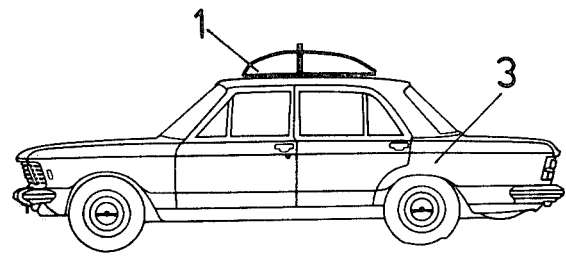
Figure 2:
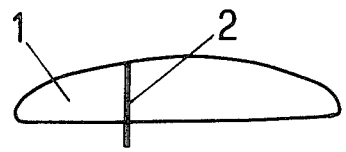
FIG. 2 is a schematic view of another embodiment of the aerial-stabilizer rudder, with more weight concentrated on the back part of the rudder.
Figure 3:
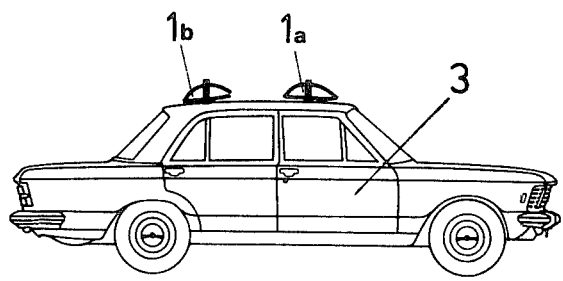
FIG. 3 is a schematic view of an embodiment that provides the application of two aerial-stabilizer rudders.

The directional control of the so-placed aerial-stabilizer rudder 1 may be by means of the steering of the car 3 controlled, in a proportioned and simultaneous manner related to the steering, by means of convenient transmissions, electrical or hydraulical devices, or other well known means. The rudder, controlled this way, will be operable to rotate to the left, when the car is steered to the left, and to the right, when the car is steered to the right.

Therefore, each time the car takes a left-corner, or makes a left turn, the aerial-stabilizer rudder will have air pressure pressing against its right face to counteract the centrifugal force. With this arrangement, the higher the speed of the car and therefore the greater the need to counteract the car's tendency to side-skid and overturn, the stronger will be the air pressure which is applied against the face of the rudder due to the forward motion of the car.

The force of a pressure on the aerial-stabilizer rudder therefore will be opposed to the centifugal forces generated by the vehicle as it executes a turn. The net skidding force will, as a result, be reduced by a very high percentage, and, consequently the tendency to side-skid and overturn will also be reduced.

The object of the present invention can be also realized in a different embodiment of the invention.

In that case, the aerial-stabilizer rudder 1 is free of control by the steering mechanism of the car.

Control of the rudder 1 is accomplished by weighting the rear portion thereof so that the rudder will displace itself automatically by centrifugal forces generated when the vehicle executes a turn.

In an alternative embodiment, the rudder 1 is secured to the vertical support 2 along a portion of the rudder which is slightly anterior to the central portion of the surface of the rudder. This will place a greater weight of the rudder on the rearward portion thereof and the rudder will act as if it has had additional weight secured to the rearward portion thereof.

Because of the approximately equal surface area displayed by both the normally forward and normally rearward portion of the rudder, there will be no net moment generated about the vertical support. Therefore, the rudder will tend to remain in the position to which it is moved as a result of the greater weight on the rearward portion. The force of the air pressure will be directed against the vertical support.

Under the influence of the centrifugal force which is generated by the vehicle changing directions, the heavier rearward portion of the Aerial-Stablizer Rudder will be rotated outwardly with respect to the direction of change of the vehicle. This way, it will act as if it were directly controlled by the steering.

According to another embodiment of the invention, two (or more) rudders 1a and 1b can be fixed to the same car.

Naturally, the dimensions of the aerial-stabilizer rudder are to be related to the weight, the kind and the speed of the car.

In order to insure that the rudder will be biased into a position broadside to the apparent wind caused by the forward motion of the car 3, the normally rearward portion 4 of the rudder 1 may have a weight 5 mounted thereto using a bolt 6 or other convenient means, as shown in FIG. 4.

In an alternative embodiment wherein the rudder 1 is rotated broadside to the apparent wind by the steering system 7 of the automobile 3, a transmission 8 may be provided between the steering system 7 and rudder 1 as schematically shown in FIG. 5.

What I claims is:

1. In combination, a vehicle and an aerial stabilizer for mounting onto said vehicle to counteract centrifugal forces tending to skid the vehicle when the vehicle is moving forward and changes directions, comprising in combination:
    a fixed vertical support operable to be secured to the top of said vehicle above the center of gravity of said vehicle;
    a rudder pivotably supported along a central portion on said fixed vertical support, and having a normally forward and a normally rearward portion, said rudder being responsive to air pressure externally of said vehicle when moving to turn said rudder to one side;
    biasing means operatively associated with the rearward portion of said rudder and operable to bias said rearward portion of said rudder outwardly and toward a forward direction about said fixed support upon angular change of direction of said support.

2. The combination of claim 1 wherein
    said biasing means comprises weight means added to said rearward portion of said rudder to cause said rearward portion to be heavier than said foward portion.

3. The combination of claim 2 wherein
    said weight means comprises an extended rudder portion.

4. The combination of claim 1 wherein said vehicle includes a steering system, and said biasing means comprises
    a transmission operably connecting said rudder with said steering system to pivot said rudder in response to a change in the orientation of the steering system.

5. The combination of claim 1, further comprising
    a second said aerial stabilizer secured to the top of said vehicle.

6. The combination of claim 1, wherein
    said biasing means is operable to pivot said rudder partially broadside to the apparent wind resulting from the motion of the vehicle, to generate air pressure acting against said rudder, said air pressure being transmitted to the vertical support and therefor to the center of gravity of said vehicle to provide a force having a vector in a direction opposing the centrifugal forces tending to cause the vehicle to skid.

7. An aerial stabilizer adapted for mounting onto a vehicle to counteract centrifugal forces tending to skid the vehicle when the vehicle is moving forward and changes directions, comprising:
    a fixed vertical support,
    a rudder pivotably supported along a central portion on said fixed vertical support, and having a normally forward and a normally rearward portion, said rudder being responsive to air pressure to turn said rudder to one side;
    biasing means operatively associated with the rearward portion of said rudder and operable to bias said rearward portion of said rudder outwardly and toward a forward direction about said fixed support upon angular change of direction of said support.

8. The aerial stabilizer of claim 7, wherein
    said biasing means comprises weight means added to said rearward portion of said rudder to cause said rearward portion to be heavier than said forward portion.

9. The aerial stabilizer of claim 8, wherein
    said weight means comprises an extended rudder portion.

* * * * *

UNITED STATES PATENT AND TRADEMARK OFFICE
CERTIFICATE OF CORRECTION

PATENT NO. : 4,181,346
DATED : January 1, 1980
INVENTOR(S) : Vincenzo Ainis

It is certified that error appears in the above-identified patent and that said Letters Patent are hereby corrected as shown below:

Col. 1, Line 14   change "turboiet" to --turbojet--

Col. 2, Line 30   "a" should be --air--

Signed and Sealed this

Twenty-eighth Day of October 1980

[SEAL]

Attest:

SIDNEY A. DIAMOND

Attesting Officer

Commissioner of Patents and Trademarks